Oct. 7, 1958  W. L. McCULLOUGH  2,855,064
HIGHWAY TRUCK
Filed Feb. 5, 1954  6 Sheets-Sheet 6
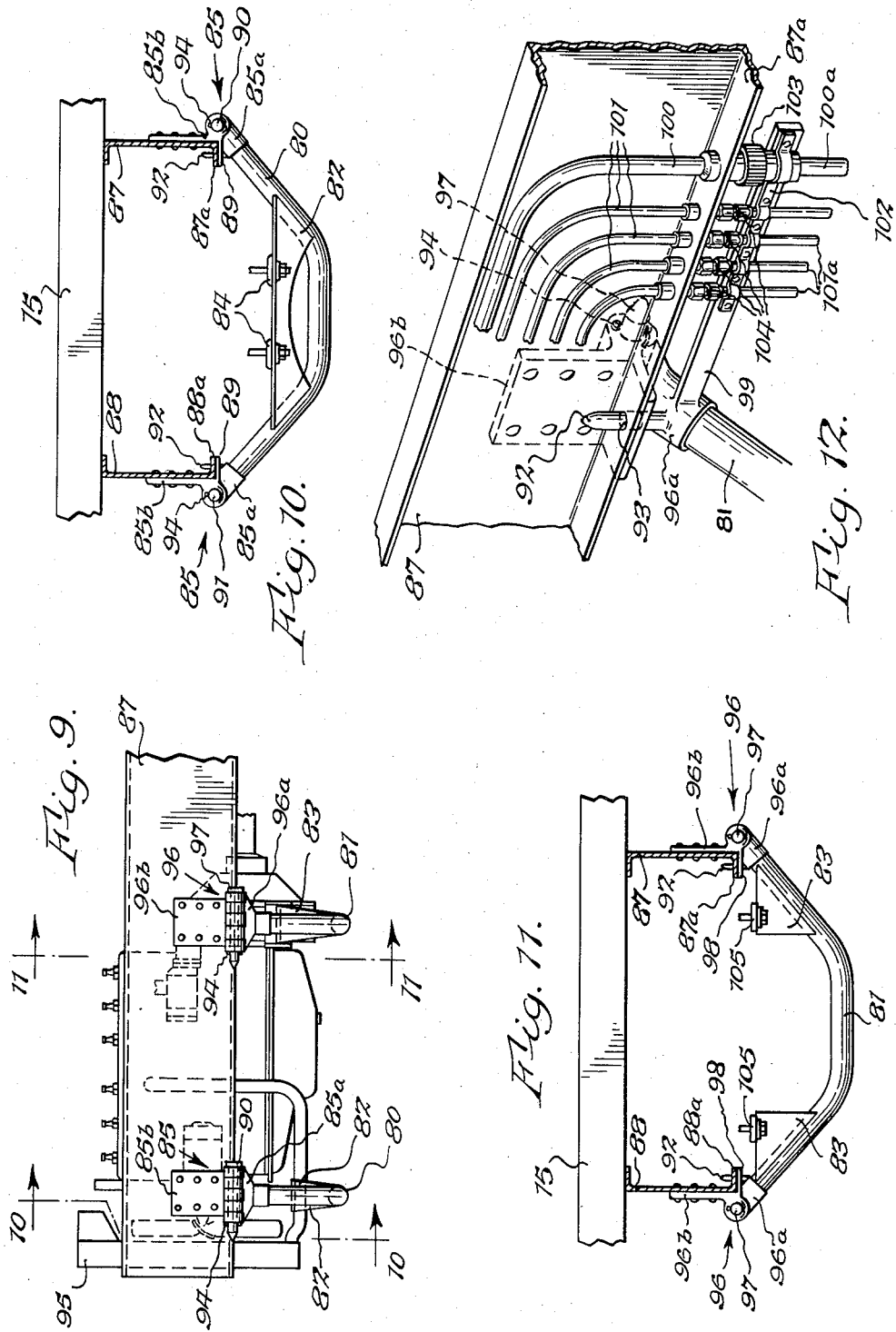

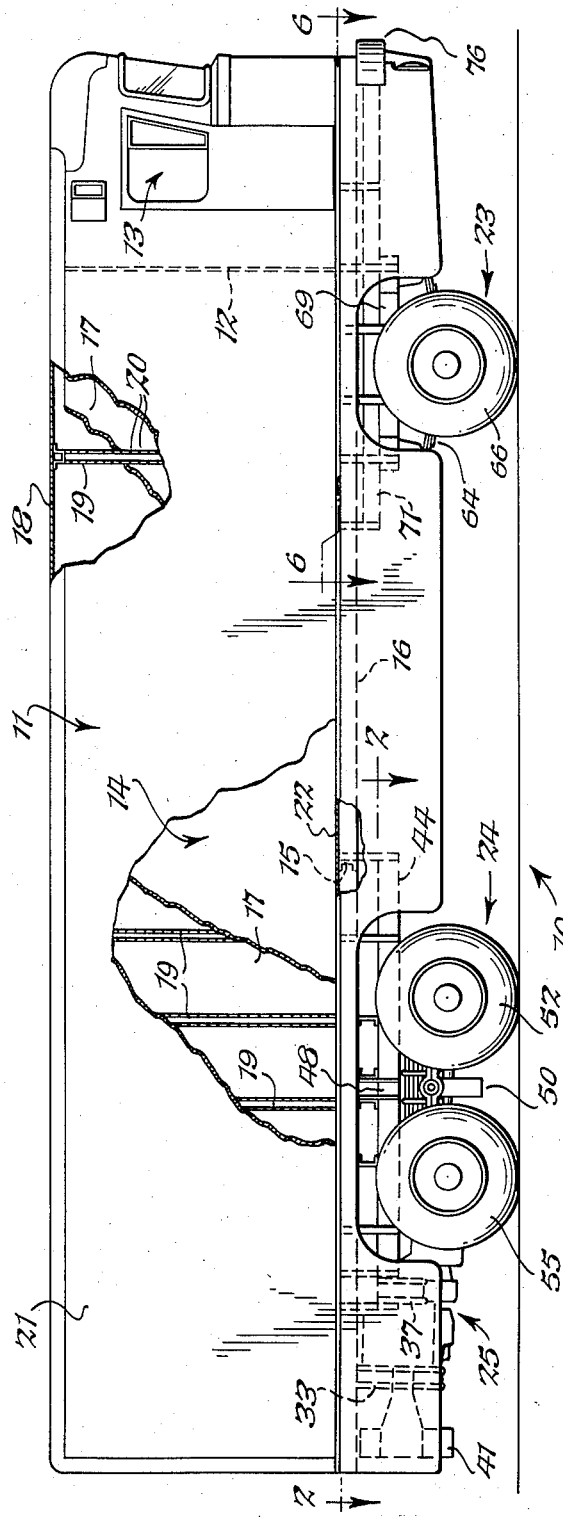

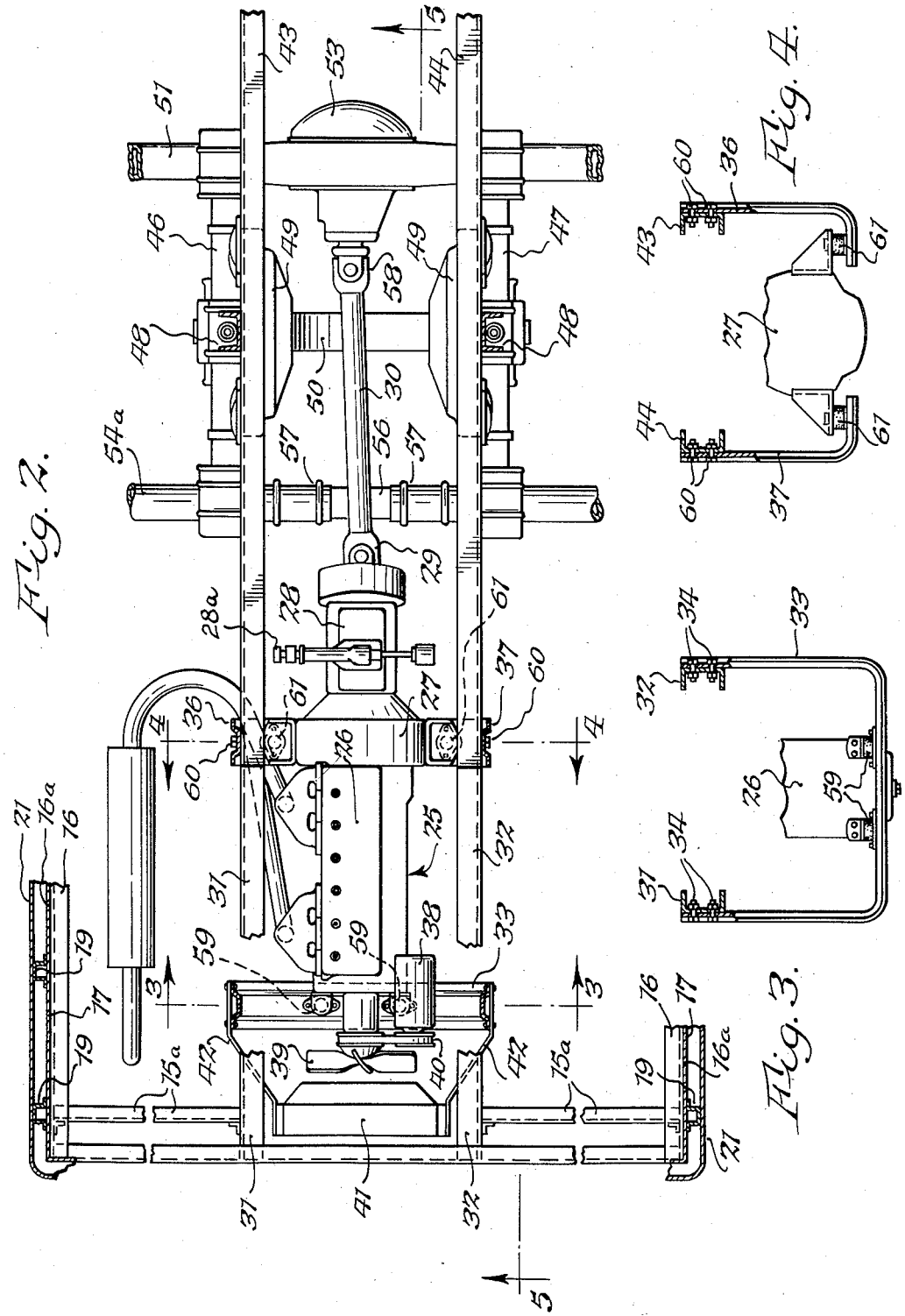

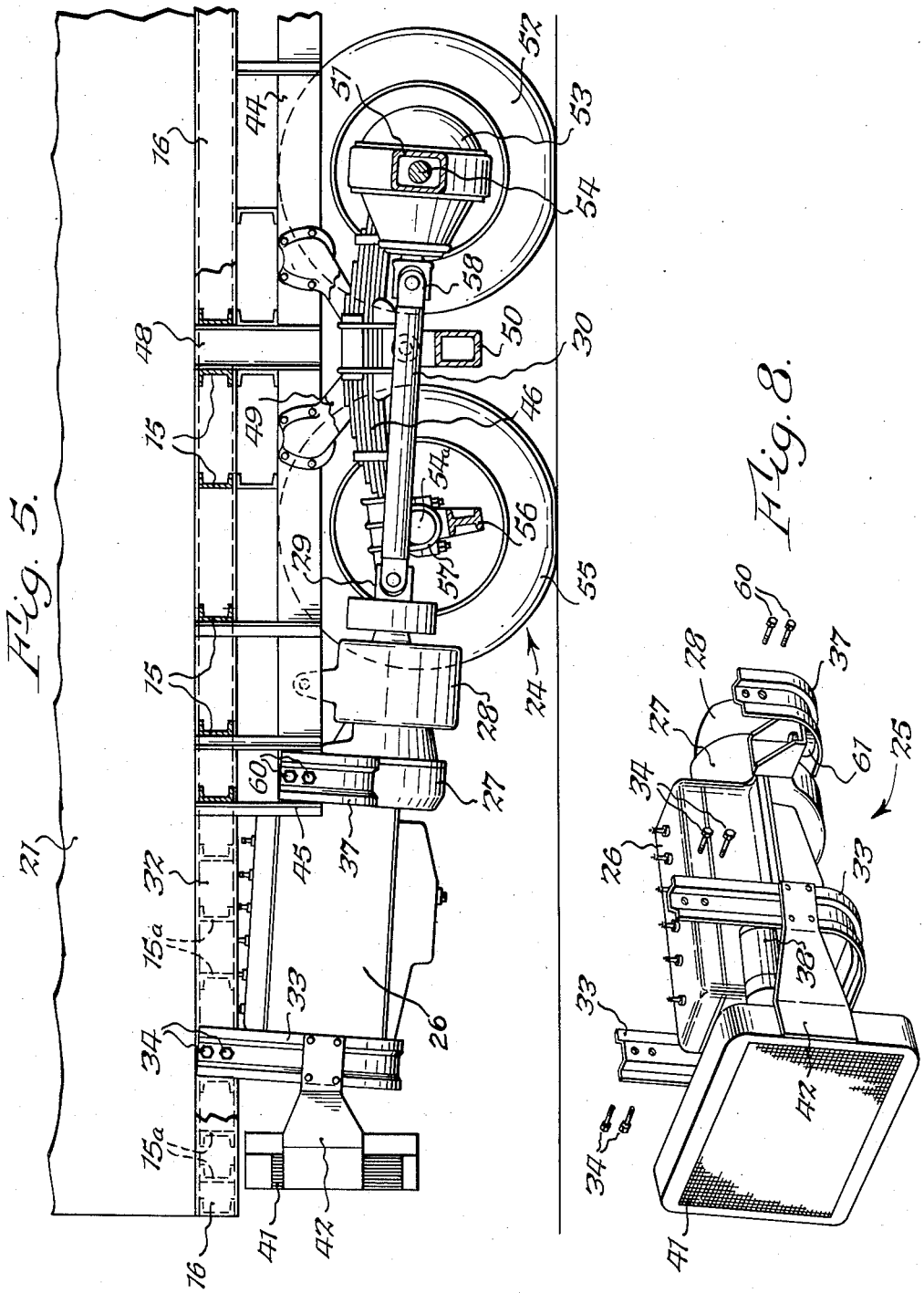

United States Patent Office 2,855,064
Patented Oct. 7, 1958

2,855,064

HIGHWAY TRUCK

William L. McCullough, Lehighton, Pa., assignor to McBright, Inc., Lehighton, Pa., a corporation of Pennsylvania Application February 5, 1954, Serial No. 408,329

7 Claims. (Cl. 180—54)

My present invention relates to cargo vehicles capable of transporting relatively large loads and more particularly to self-propelled units as distinguished from multiple units involving nonself-propelled trailers which support the pay load and prime movers or tractors which supply the motive power.

Under present day conditions, with rigorous restrictions imposed by numerous authorities on the size of the vehicle as well as the gross weight thereof permitted to travel roads under their jurisdiction, it is essential that the ratio of the pay load to the gross weight of the combined load and vehicle be kept as large as possible. While numerous attempts have been made heretofore to improve the usefulness and efficiency of highway cargo vehicles, these attempts have been aimed primarily at other aspects of the problem. For example, various attempts have been made to provide detachable, more or less self-contained units, such as power units and cargo-carrying units, which may be combined to form what are commonly called tractor-trailer combines. It has also been proposed to provide a detachable control unit for the purpose of having a combined arrangement of three independent but interconnected units, each of which being more or less self-supporting. While various advantages may be attributed to such constructions, none have been found which incorporate the advantages of a favorable ratio of pay load to gross weight, while at the same time making possible an overall reduction in gross weight as well as size of the unit.

Thus, under present day conditions, shippers of merchandise or cargo are often faced with the problem of choosing between shipping a reduced amount of cargo over the entire route or transshipping the cargo at one or more points along the route to avoid violating regulations enforced over part of the route to the destination. Very often, the combined weight of pay load and vehicle does not exceed the set maximum but the size of the vehicle does exceed the maximum size permitted in certain localities. This again poses the problem of transshipment, in this instance, to a smaller vehicle, before entering such localities unless a sufficiently small vehicle is used from the outset.

It is, therefore, a principal object of my invention to provide a highway truck capable of transporting a pay load, the weight of which is in favorable proportion to the weight of the highway truck itself, and with the overall size of the truck substantially reduced as compared to trucks capable of transporting equivalent pay loads.

A further object is to provide a highway truck capable of transporting a relatively large pay load with the overall size of the truck held to a minimum and only negligibly larger than the space provided for the pay load, while at the same time incorporating the important features of reduced weight, simplicity of construction, and easy access for maintenance and repair.

A more specific object is to provide a unitary highway truck having a body portion of enhanced strength but yet of simple construction for containing or supporting a pay load, which body portion functions as the main stress-absorbing portion of the vehicle and to which the other appurtenances, including the power train, control cab and running gear, are attached in such manner that each is readily accessible for maintenance and repair, as well as permitting ready removal of the power unit and the other primary elements of the power train.

In a preferred embodiment of my invention, the body portion is constructed of structural elements designed to provide maximum strength and stress-withstanding properties, while at the same time preserving to a high degree compactness and simplicity. Thus, the body is constructed in such a manner that it is capable of supporting not only the pay load but also the operator's compartment and controls, the power unit and power train, and also serves as the structural member from which the running gear is suspended. The power train may include a conventional internal combustion engine, a transmission unit and other appurtenances, such as couplings and shafts. The coupling between the transmission and engine may be a clutch unit of any suitable construction. These units form a power train cluster which includes among others the engine, clutch and transmission, which extend in that sequence from adjacent the rear end of the body portion toward the front and are slung below the bed of the body portion by means of a readily disconnected cradle supported from the body portion. An access opening is provided in the bed of the body portion adjacent the rear thereof which opens onto the top of the engine to facilitate the performance of light maintenance. When heavy maintenance is required, the power train cluster, being supported by a cradle arrangement, is readily and quickly disconnected as a unit from the body portion. The cluster and cradle may be lowered from the body portion and removed to where maintenance may be conveniently performed. If desired, a substitute cluster including the cradle, engine, clutch and transmisison may be utilized to keep the vehicle in service while the required maintenance or repair work is being performed.

The foregoing, as well as additional objects and advantages of my invention, will be apparent from the following description of a preferred embodiment thereof and the drawings in which Figure 1 is a side elevational view of a truck constructed in accordance with my present invention and partially broken away for convenience;

Figure 2 is a sectional view taken through the line 2—2 of Figure 1 on an enlarged scale;

Figure 3 is a sectional view through the line 3—3 of Figure 2 partially broken away for convenience;

Figure 4 is a similar view through the line 4—4 of Figure 2;

Figure 5 is an elevational view of the lower rear portion of the truck shown in Figure 1 and on an enlarged scale partially broken away for convenience;

Figure 8 is a perspective view of the cluster mount including the primary elements of the power train after having been disconnected and dropped from the normal position shown in Figure 5;

Figure 9 is a side elevational view of another arrangement for supporting the power train cluster;

Figure 6:
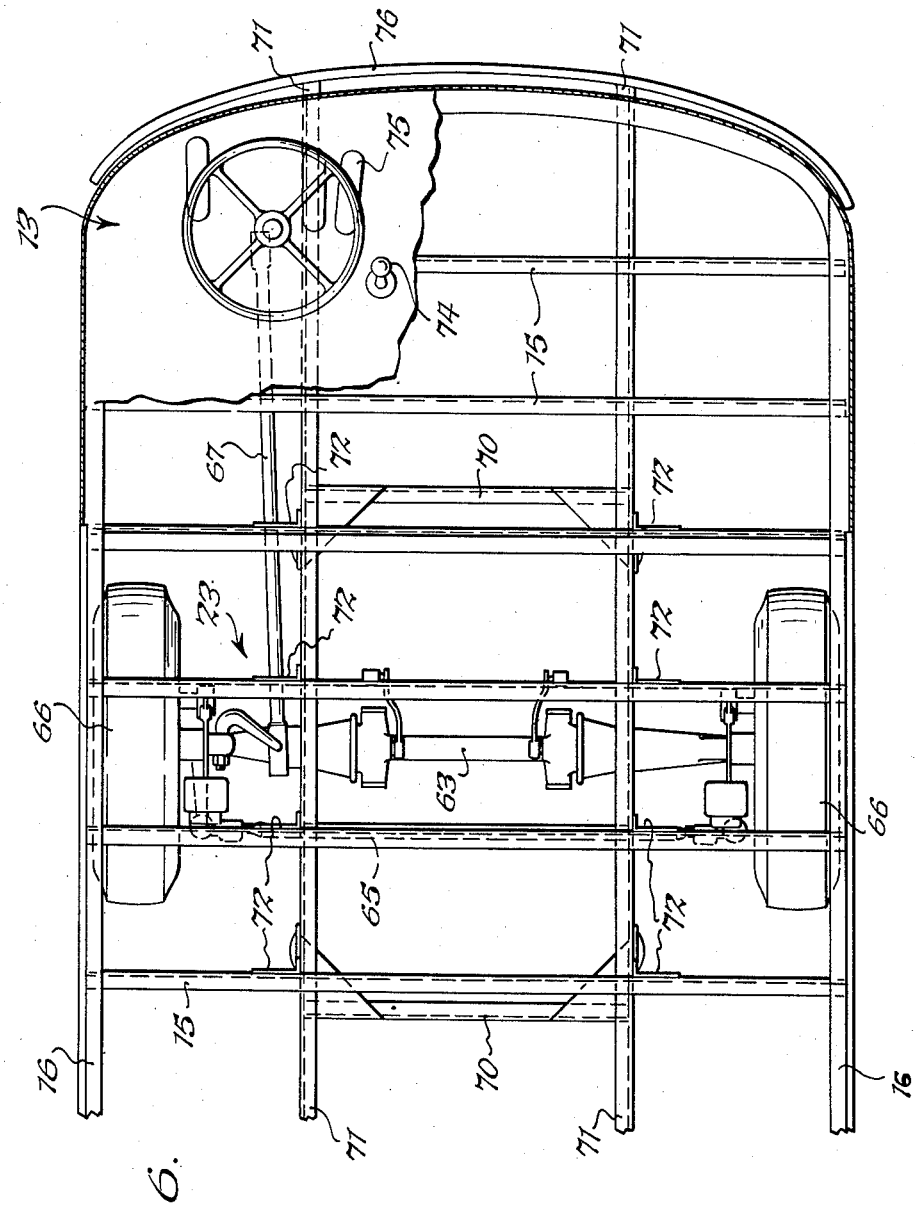
Figure 6 is a sectional view through the line 6—6 of Figure 1 also on an enlarged scale and partially broken away.

Figures 10 and 11 are sectional views taken through the lines 10—10 and 11—11 of Figure 9 respectively with the engine omitted; and Figure 12 is a perspective view on an enlarged scale showing the manner of coupling the various lines such as the electrical and air lines.

Referring now to the drawings in detail, highway truck 10 has a body portion 11 divided by front wall 12 into an operator's compartment 13 on the forward side thereof and a pay load compartment 14 on the rearward side. The bed or floor of body portion 11 comprises a plurality of spaced transversely extending channeled joists or members 15 most clearly shown in Figures 5, 6 and 7. It will be noted that the spacing and number of joists 15 per unit length varies from front to back. In any event, a sufficient number is provided to ensure the desired strength. The ends of transverse joists 15 are aligned and seated in a longitudinally extending recess formed by channeled longitudinal rails 16 along each side of body portion 11. To the surface 16a (Figure 2) of rails 16 is rigidly secured a metal sheet 17 by means of rivets or the like. Metal sheets 17 form the upward extending sides of body portion 11 and are rigidified by means of channeled ribs or uprights 19 secured as by rivets to sheets 17. The lower end portions of uprights 19 are also rigidly secured to rails 16, as indicated in Figure 2. As shown in Figures 1 and 2, an outer side covering may be secured to uprights 19 for additional strength. Roofing 18 is supported by sheets 17 and uprights 19, as is also indicated in Figure 1.

Transverse members or joists 15 serve as the support for sheet metal flooring 22 (Figure 1) which extends from front to rear and side to side in body portion 11. It is apparent that body portion 11 is constructed in such manner as to render the same structurally strong. Furthermore, body portion 11 is constructed of elements which are not only able to withstand the stress encountered during use but are also relatively light, being constructed of such materials as aluminum and alloys thereof. Thus, front road wheel assembly 23, rear road wheel assembly 24 and power train cluster 25 are suspended from and interconnected by body portion 11.

Referring now to Figures 2, 5 and 8, some of the rearmost transverse members 15a do not extend continuously across the bed or body portion 11 but only extend between outside rails 16 to a pair of spaced relatively short channel members 31, 32 which extend longitudinally of body portion 11 and parallel to engine 26. Readily disconnectable means forming a support cradle for the power train cluster is readily removably connected to spaced channel members. As shown in Figure 3 a substantially U-shaped yoke 33 is rigidly secured adjacent the open end thereof to each of the channel members 31, 32 by means of readily removable tapered bolts 34 extending through the end portions of the arms of yoke 33. Engine 26 is mounted with what is usually considered the front end thereof facing rearward and supported on the base of yoke 33 by means of resilient shock absorbing engine mountings 59. As will be described in detail hereinbelow, a pair of supporting arms 36, 37 are provided to cooperate with yoke 33 to support power train cluster 25 about where the clutch housing 27 is fixed to engine 26. A removable plate supported on members 31, 32 forms part of floor 22 and serves to give ready access to engine 26, as well as such appurtenances as generator 38, fan 39 and belt 40. As shown, radiator 41 may be rigidly secured to and supported from yoke 33 by means of support members 42. Access to the fill hose of radiator 41 may also be had through an access opening (not shown) provided in the rear.

Rear road wheel assembly 24 is joined to body portion 11 by a pair of spaced parallel channel members 43, 44 which extend longitudinally in line with members 31, 32 but spaced downwardly therefrom, as most clearly shown in Figure 5. In the present instance, the rear end portions of members 43, 44 extend respectively under the front end portions of short channel members 31, 32 and are secured thereto by means of brackets, one of which being shown at 45. Other vertically extending angle pieces and brackets serve to rigidly interconnect parallel channel members 43, 44 with those of the transversely extending joists 15 which extend over the same. In particular, a structurally strong connection is made substantially above the center of the rear road wheel springs 46, 47 by means of a plurality of upwardly extending channel pieces 48 secured to channel members 43, 44 and to the transverse joists 15 between which they extend, as indicated in Figure 5.

As shown most clearly in Figures 2 and 5, the upwardly extending supporting arms 36, 37 are secured respectively to channel members 43, 44 by means of readily removable bolts 60. Engine mounting brackets 61 are each supported on the horizontal portion of each of the supporting arms 36, 37 and are each secured to engine 26, as indicated in Figure 4. As will be more fully pointed out, removal of bolts 34 and 60 permits ready removal of the power train cluster supported by yoke 33 and supporting arms 36, 37.

Each of the rear springs 46, 47 is provided with a bracket 49 which is rigidly secured thereto and to the channel member 43, 44 associated therewith (Figure 2). When desired, a downwardly bowed member 50 may be provided, as shown, between and secured adjacent its ends to each of the rear spring brackets 49 for additionally bracing the rear wheel assembly 24. An axle housing 51 extends between the forward set 52 of rear road wheels and is secured to the leading aligned end portions of rear springs 46, 47. A conventional differential unit 53 is secured to and supported by axle housing 51 and has laterally extending shafts 54. Shafts 54 are mounted in a suitable manner and extend through housing 51 to each of the wheels 52 for delivering motive power thereto. Stub axle assemblies 54a are each joined to one of the rear road wheels 55 in a conventional manner. As shown most clearly in Figure 2, stub axle assemblies 54a are spaced apart and are interconnected by an I-shaped member 56 which extends below the adjacent ends of axles 54a and is secured to each, as indicated at 57 (Figure 2). Drive shaft 30, which is coupled to transmission 28 by a universal joint 29, extends forwardly through the gap between stub axle assemblies 54a over member 56 and over bowed member 50 to differential unit 53 to which it is joined by a universal coupling 58. Ample clearance is provided over each of the members 50 and 56 to permit unimpeded movement of drive shaft 30.

Figure 7:
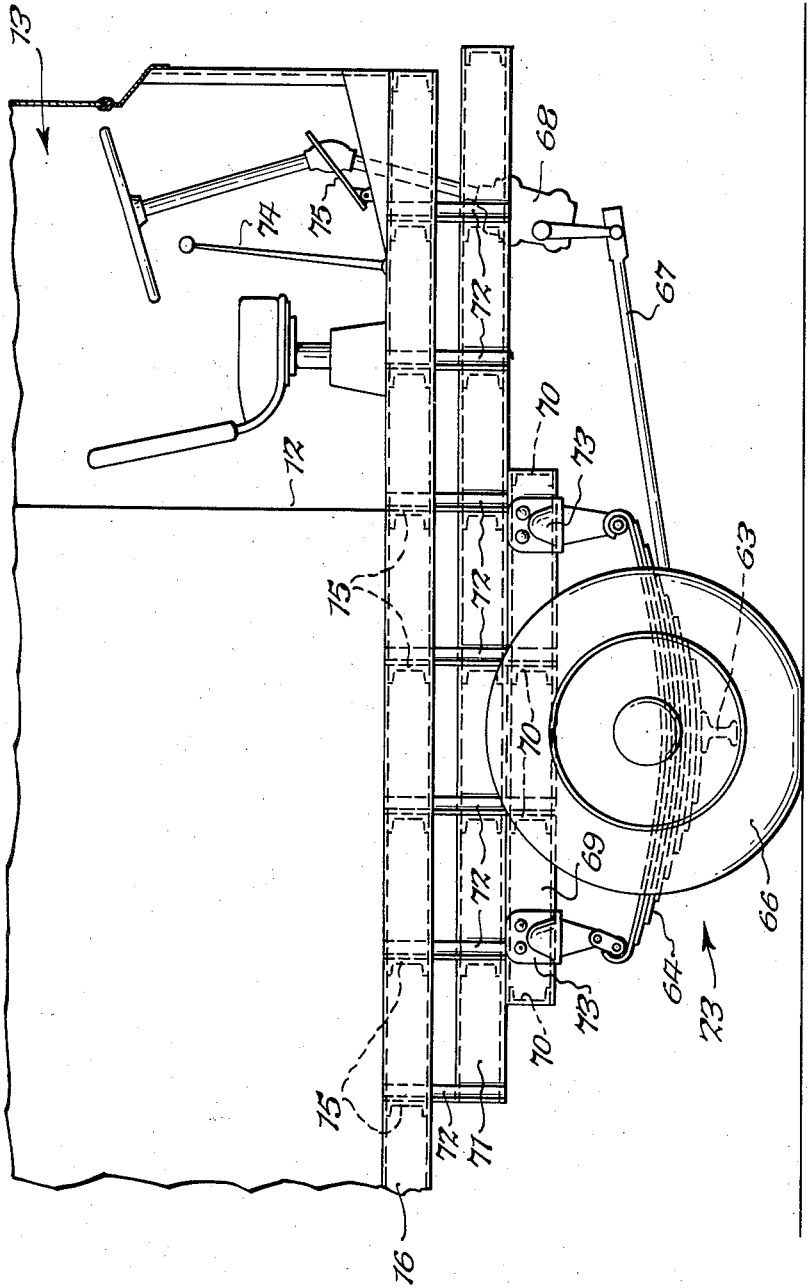
Figure 7 is a fragmentary side elevational view partially in section of that portion of the truck shown in Figure 6.

Referring now to Figures 6 and 7, front road wheel assembly 23 is of conventional construction and includes axle 63, springs 64 and tie rod 65. Front road wheels 66 are each mounted in the usual way. Steering may be effected in the well known manner with the steering linkage including rod 67 coupled to the left front wheel and tie rod 65 as shown in Figure 6. The front end of rod 67 is connected to steering gear 68 which is in turn coupled to an operator's steering wheel by conventional linkage. Other steering arrangements may also be utilized such as for example that commonly referred to as power steering.

In accordance with the present invention, a pair of parallel spaced longitudinally extending channel members 69, only one of which may be seen in Figure 7, are rigidly interconnected by transverse members 70 which extend therebetween. A second pair of parallel members 71 extend immediately above channel members 69 and are connected thereto as well as to the transverse joists 15 extending over the same by vertical brackets 72. While channel members 69 are only sufficiently long to overhang the front road wheel assembly 23, members 71 are carried forward to support a conventional front bumper assembly 76. As shown in Figure 7, each of the front springs to which front axle 63 is secured, is in turn connected to one of the channel members 69 by means of fittings 73.

As has been described, the operator's compartment 13 is provided to the front of wall 12 and is equipped with suitable steering equipment 69. There is also provided the usual controls, such as a shift lever 74 and throttle control lever 75. These, as well as other controls such as a brake control and clutch pedal not shown, are conventional and need not therefore be described in detail here. However, as is known, suitable linkage is provided for connecting the various control levers and pedals to the elements controlled thereby. While the conventional braking system has been omitted for simplicity, transmission control lever 28a (Figure 2) has been shown and is operatively connected to gear shift lever 74 by linkage which has also been omitted from the drawings.

Several important features of my present invention relate to the accessibility and mounting of the power train cluster 25. As most clearly shown in Figure 8, it is only necessary to remove the bolts 34 and 60 to remove the power train cluster. Of course, certain elements must be first disconnected. These include such connections as the water fill hose, fuel line, air lines, wiring, the joint 29 between transmission 28 and drive shaft 30, and the gear shift and mechanical brake linkage. These connections are of the quick disconnect type whereby feasible. This is particularly the case in connection with the wiring where a quick disconnect plug is utilized. It should be noted that, while an access opening to engine 26 is provided in the bed of body portion 11, it is not necessary to disturb the pay load to gain access to the upper parts of the engine. Ample clearance is provided between the top of the power train cluster 25 and floor 22 to permit access to the upper parts from below, should such parts require attention during operation. When power train cluster 25 is down, the various parts included therein which heretofore have required work to be performed thereon in extremely crowded and cramping conditions are now in the open and work may be performed thereon under conditions which favor better and more efficient performance on the part of the servicing personnel. This is, of course, a very important factor and leads not only to more efficient operation of these units but also makes possible a longer useful life.

In Figures 9-11, there is shown another arrangement by means of which the power train cluster may be advantageously supported from and connected to the body portion of the vehicle in a quick disconnect manner. A pair of somewhat bowed or U-shaped support members 80, 81, each forming a yoke, are provided with mounting plates 82, 83 respectively. In the present instance, mounting plate 82 is connected adjacent opposite ends thereof as by welding to the spaced arms of support member 80 and forms a bridge therebetween. A pair of engine mountings 84 are supported on and connected to mounting plate 82 and serve to support the rearwardly presented end of the power train cluster. The upwardly presented end portions of support member 80 each have secured thereto one member 85a of a hinge-like connector 85 which mates with a complementary member 85b rigidly secured to elongated channel members 87, 88. Members 85b are aligned so as to receive member 85a while a stop plate 89 carried by each of the members 85a and extending inwardly therefrom, abuts the downwardly presented surface of flange portions 87a, 88a of each of the channel members 87, 88 respectively when locking pins 90, 91 are inserted in the respective hinge-like connectors 85 and serve to prevent movement of support member 80 relative to channel members 87, 88.

To facilitate rapid alignment and assembly of the members forming hinge-like connectors 85, I preferably provide a locating or centering pin 92 which may be fixed with each of the members 85a so as to extend from stop plate 89 in such spatial relationship with member 85a that when centering pins 92 are each started in an aperture 93 (Figure 12) formed in flange portions 87a, 88a of each of the channel members 87, 88 the mating halves of each of the hinge-like connectors are thereby aligned.

Conveniently, one end of each of the locking pins 90, 91 is provided with a shoulder while the other end portion projects from the channel formed by the mating halves of the hinge-like connectors 85 and is transversely bored to receive a cotter pin 94 or the like which serves to secure each of the locking pins 91, 92 in a quick removable manner. Obviously, cotter pins 94 may be of relatively pliable metal inasmuch as they do not serve to support any of the weight of the power train cluster nor do they need to withstand any substantial forces and merely serve to prevent locking pins 90, 91 from drifting out of position.

It will be noted that elongated channel members 87, 88 correspond with channel members 43, 44. However, channel members 87, 88 are of somewhat different construction and extend forwardly from below the rearmost transverse joists 15 to just forward of the rear road wheel assembly 24. Brackets 95, one of which is shown in Figure 9, serve to secure the ends of channel members 87, 88 to joists 15. It will further be noted that with the present arrangement short channel members 31, 32 may be omitted and support member 81 is secured to channel members 87, 88 as has been described in connection with support member 80. Thus, the upwardly presented end portions of support member 81 have secured thereto members 96a which mate with complementary members 96b connected to channel members 87, 88 and aligned to form hinge-like connectors 96 secured by locking pins 97. Stop plates 98 are also provided on members 96a and function as was described in connection with stop plates 89. Mounting plates 83 may be spaced as shown on support member 81 and each has secured thereto an engine mounting 105 to which the forwardly presented end portion of the power train cluster is connected. Together, support members 80, 81 form a cradle by means of which the power train cluster may be expeditiously mounted and demounted with ease.

As shown most clearly in Figure 12, a convenient arrangement for coupling and decoupling the electrical wires and the various linkages includes a support member 99 rigidly fixed to support member 81 adjacent one upwardly presented end thereof. Various conduits such as electrical wire conduit 100 containing a plurality of electrical wires leading to controls located in the operator's compartment as well as various air lines 101 extend through apertures provided therefor in flange portion 87a of channel member 87. Conduit 100 and air lines 101 terminate, as shown, just below channel member 87 and above support member 99 which carries by means of strap 102 a conduit 100a and air lines 101a leading to various accessories. The ends of conduits 100 and 100a terminate in the mating halves of a quick disconnect plug 103 while couplings 104 afford a convenient means for readily coupling and decoupling air lines 101 and 101a. As shown, conduit 100a and air lines 101a are supported on support member 99 so as to be substantially in alignment with ends of the corresponding conduit 100 and air lines 101 respectively.

It is apparent from the foregoing that I have provided a novel, highly useful truck structure. My invention makes possible the omission of a relatively heavy chassis frame member while at the same time provides a unitary truck structure which in addition to being relatively light in weight provides a large pay load space and permits easy access to the engine as well as other parts of the power train. Because of the manner in which the power train is arranged and mounted, an overall economy of space is attained. Thus, for a given truck length, substantially more pay load may be carried than was heretofore possible. In accordance with my invention and in the preferred embodiment thereof shown herein, lightweight metals or alloys such as aluminum are utilized substantially throughout, the various structural elements being so designed as to augment their strength.

It will be apparent that certain features of the present invention may be advantageously used in connection with inherently rigid body structures differing somewhat in detail from the one shown herein. For example, the advantages flowing from utilization of the unitary power train cluster and its readily removable support may be obtained in such other structures.

The primary objects of the present invention are, of course, best secured when the body structure is one offering great inherent strength combined with lightness. For this reason it is preferred to utilize a body construction in which substantially all of the members thereof contribute to its strength and rigidity. The body construction shown herein is one in which the walls, or skin, in particular, contribute substantially to strength and rigidity. Thus, monocoque constructions in general as well as cylindrical tanks and the like are particularly desirable.

While I have described my invention in connection with the preferred embodiment thereof shown, it is intended that all equivalents thereof as come within the scope of the claims be included within my invention.

I claim:

1. A unitary self-propelled cargo-carrying highway truck, comprising a body portion including a bed and side walls rigidly interconnected, said bed comprising a plurality of transversely extending joists, longitudinally extending side rails secured to said joists adjacent the outer ends thereof and to said side walls, a front road wheel assembly, a rear road wheel assembly, mutually discrete longitudinally spaced first and second connecting means respectively securing said front road wheel assembly and said rear road wheel assembly directly to said joists in spaced relation, said joists and side rails serving as the sole interconnection between said first connecting means associated with said front road wheel assembly and said second connecting means associated with said rear road wheel assembly, and a power train cluster below said joists and including at least an engine and means readily removably supporting said power train cluster from said truck and below said joists with said engine extending rearwardly of said rear road wheel assembly.

2. A unitary self-propelled cargo-carrying highway truck, comprising a body portion including a bed and side walls rigidly interconnected, said bed comprising a plurality of transversely extending joists, longitudinally extending side rails secured to said joists adjacent the outer ends thereof and to said side walls, whereby said joists, side rails and side walls form a self-supporting structure capable of supporting a pay load, power train and running gear, said power train comprising an engine and transmission unit operatively interconnected and secured together, spaced front and rear road wheel assemblies, means detachably supporting said engine and transmission unit from said truck and below said joists rearwardly of said rear road wheel assembly mutually discrete longitudinally spaced first and second connecting means respectively securing said front road wheel assembly and said rear road wheel assembly directly to said joists in spaced relation, said joists and side rails serving as the sole interconnection between said first connecting means associated with said front road wheel assembly and said second connecting means associated with said rear road wheel assembly.

3. A unitary self-propelled cargo-carrying highway truck, comprising spaced apart parallel side rails, a plurality of spaced transverse members extending between said side rails and secured thereto, sheet metal side wall members secured to said side rails, a plurality of spaced vertical ribs secured to said wall members and to said side rails, a front road wheel assembly, a rear road wheel assembly, mutually discrete longitudinally spaced first and second connecting means respectively securing said front road wheel assembly and said rear road wheel assembly directly to said transverse members in spaced relation, said transverse members and side rails serving as the sole interconnection between said first connecting means associated with said front road wheel assembly and said second connecting means associated with said rear road wheel assembly, a power train cluster including an engine and transmission unit disposed rearwardly of said rear road wheel assembly and below said transverse members, a cradle secured to said cluster and readily detachably supported from said truck and below said transverse members and side rails rearwardly of said rear road wheel assembly, whereby said power train cluster may be disconnected from said truck as a unit by disconnecting said cradle.

4. A unitary self-propelled cargo-carrying highway truck, comprising spaced apart parallel side rails, a plurality of spaced transverse members extending between said side rails and secured thereto, inner sheet metal side wall members secured adjacent the lower edges thereof to said side rails, a plurality of spaced vertical ribs secured to the outer surface of said inner wall members and to said side rails, outer sheet metal side wall members secured to the outer side of said ribs, a front road wheel assembly, a rear road wheel assembly, mutually discrete longitudinally spaced first and second connecting means respectively securing said front road wheel assembly and said rear road wheel assembly directly to said transverse members in spaced relation, said transverse members and side rails serving as the sole interconnection between said first connecting means associated with said front road wheel assembly and said second connecting means associated with said rear road wheel assembly, a power train cluster including an engine and transmission unit disposed rearwardly of said rear road wheel assembly and below said transverse members, a cradle secured to said cluster and readily detachably supported from said truck and below said transverse members and side rails, whereby said power train cluster may be disconnected from said truck as a unit by disconnecting said cradle.

5. A unitary self-propelled cargo-carrying highway truck, comprising a body portion including spaced apart parallel channeled side rails disposed with the channels opening toward each other, a plurality of spaced transverse channel members extending between said side rails and having their opposite end portions seated in said channels and secured to said rails, inner sheet metal side wall members secured adjacent the lower edges thereof to the outwardly presented surfaces of said side rails, a plurality of spaced vertically extending channeled ribs secured to the outer surface of said sheet metal wall members and to said side rails, outer sheet metal side wall members secured to the outer side of said ribs and enclosing said inner wall members, a front road wheel assembly, a rear road wheel assembly, mutually discrete longitudinally spaced first and second connecting means respectively securing said front road wheel assembly and said rear road wheel assembly directly to said transverse members in spaced relation, said transverse members and side rails serving as the sole interconnection between said first connecting means associated with said front road wheel assembly and said second connecting means associated with said rear road wheel assembly, a unitary power train cluster supported below said transverse channel members rearwardly of said rear road wheel assembly and including an engine, radiator and transmission unit, a U-shaped yoke secured to one end portion of said engine with the open end thereof upwardly presented, the end portions of said yoke extending on opposite sides of said engine and detachably secured to said body portion, a pair of upwardly extending supporting arms each secured to opposite sides of said engine and spaced from said yoke, the upper ends of each of said supporting arms being secured to said second connecting means, and support members connected to said yoke and said radiator and rigidly supporting the latter.

6. A unitary self-propelled cargo-carrying highway truck, comprising a body portion including spaced apart parallel channeled side rails disposed with the channels opening toward each other, a plurality of spaced transverse channel members extending between said side rails and having their opposite end portions seated in said channels and secured to said rails, inner sheet metal side wall members secured adjacent the lower edges thereof to the outwardly presented surfaces of said side rails, a plurality of spaced vertically extending channeled ribs secured to the outer surface of said sheet metal wall members and to said side rails, outer sheet metal side wall members secured to the outer side of said ribs and enclosing said inner wall members, a front road wheel assembly, a rear road wheel assembly, mutually discrete longitudinally spaced first and second connecting means respectively securing said front road wheel assembly and said rear road wheel assembly directly to said transverse members in spaced relation, said transverse members and side rails serving as the sole interconnection between said first connecting means associated with said front road wheel assembly and said second connecting means associated with said rear road wheel assembly, a unitary power train cluster supported below said transverse channel members rearwardly of said rear road wheel assembly and including at least an engine, a yoke secured to one end portion of said power train cluster with the end portions of said yoke extending on opposite sides of said power train cluster, means for quick detachably supporting the end portions of said yoke below said body portion, another yoke secured to the other end portion of said power train cluster with the end portions thereof extending on opposite sides of said power train cluster, and means for quick detachably supporting the end portions of said another yoke from said truck and below said body portion.

7. A unitary self-propelled cargo-carrying highway truck as set forth in claim 6 wherein said quick detachably securing means comprises a plurality of hinge members each secured to one of the end portions of each of said yokes, a plurality of complementary hinge members each secured to said second connecting means and aligned to mate with one of the hinge members secured to said yokes, and a plurality of locking pins one for each of the hinge-like connectors formed by the mating hinge members for securing the mating hinge members together.

References Cited in the file of this patent

UNITED STATES PATENTS

| | | |
|---|---|---|
| 842,260 | Sheer | Jan. 29, 1907 |
| 884,117 | Winton | Apr. 7, 1908 |
| 1,349,418 | Flynn | Aug. 10, 1920 |
| 1,384,169 | Theberath | July 12, 1921 |
| 1,442,220 | Kelly | Jan. 16, 1923 |
| 2,140,109 | Kellar | Dec. 13, 1938 |
| 2,152,568 | Renno | Mar. 28, 1939 |
| 2,250,523 | Christiansen | July 29, 1941 |
| 2,457,400 | Roos | Dec. 28, 1948 |
| 2,490,162 | Ruelle | Dec. 6, 1949 |
| 2,773,304 | Fageol | Dec. 11, 1956 |

FOREIGN PATENTS

| | | |
|---|---|---|
| 498,613 | Great Britain | July 11, 1939 |

OTHER REFERENCES

Publication, "Commercial Car Journal," issue of October 1953, page 75, article, "Powered-Van Uses White Engine."

Publication, "Railway Age," vol. 129, Issue 16, page 44, October 15, 1950, article, "Trailer or Truck?"